United States Patent [19]

Schlossberg

[11] 4,131,792

[45] Dec. 26, 1978

[54] FABRY-PEROT DIPLEXER

[75] Inventor: Howard Schlossberg, Lexington, Mass.

[73] Assignee: The United States of America as represented by the Secretary of the Air Force, Washington, D.C.

[21] Appl. No.: 871,864

[22] Filed: Jan. 24, 1978

[51] Int. Cl.² .............................................. H04B 9/00
[52] U.S. Cl. ................................... 250/199; 329/144; 356/349; 356/352
[58] Field of Search ................. 250/199; 329/DIG. 1, 329/144; 356/106 R, 106 LR, 112, 111, 113

[56] References Cited

U.S. PATENT DOCUMENTS

| | | | |
|---|---|---|---|
| 3,156,825 | 11/1964 | Lines | 250/199 |
| 3,215,840 | 11/1965 | Byhrer | 250/199 |
| 3,939,341 | 2/1976 | Graves | 329/144 |

Primary Examiner—Robert L. Richardson
Assistant Examiner—Joseph A. Orsino, Jr.
Attorney, Agent, or Firm—Joseph E. Rusz; Jacob N. Erlich

[57] ABSTRACT

An improved Fabry-Perot diplexer for receiving a first and second signal of differing frequency from different directions and outputting these signals in parallel relationship with respect to one another and in the same direction. The diplexer is made up of four highly reflective elements having substantially no transmission and defining an optical path therebetween. Interposed within the optical path are a pair of beamsplitters. The total length of the optical path is defined for resonance at the frequency of a first input signal and non-resonance at the frequencies of a second input signal. As a result thereof the output signals have substantially no loss associated therewith.

16 Claims, 4 Drawing Figures

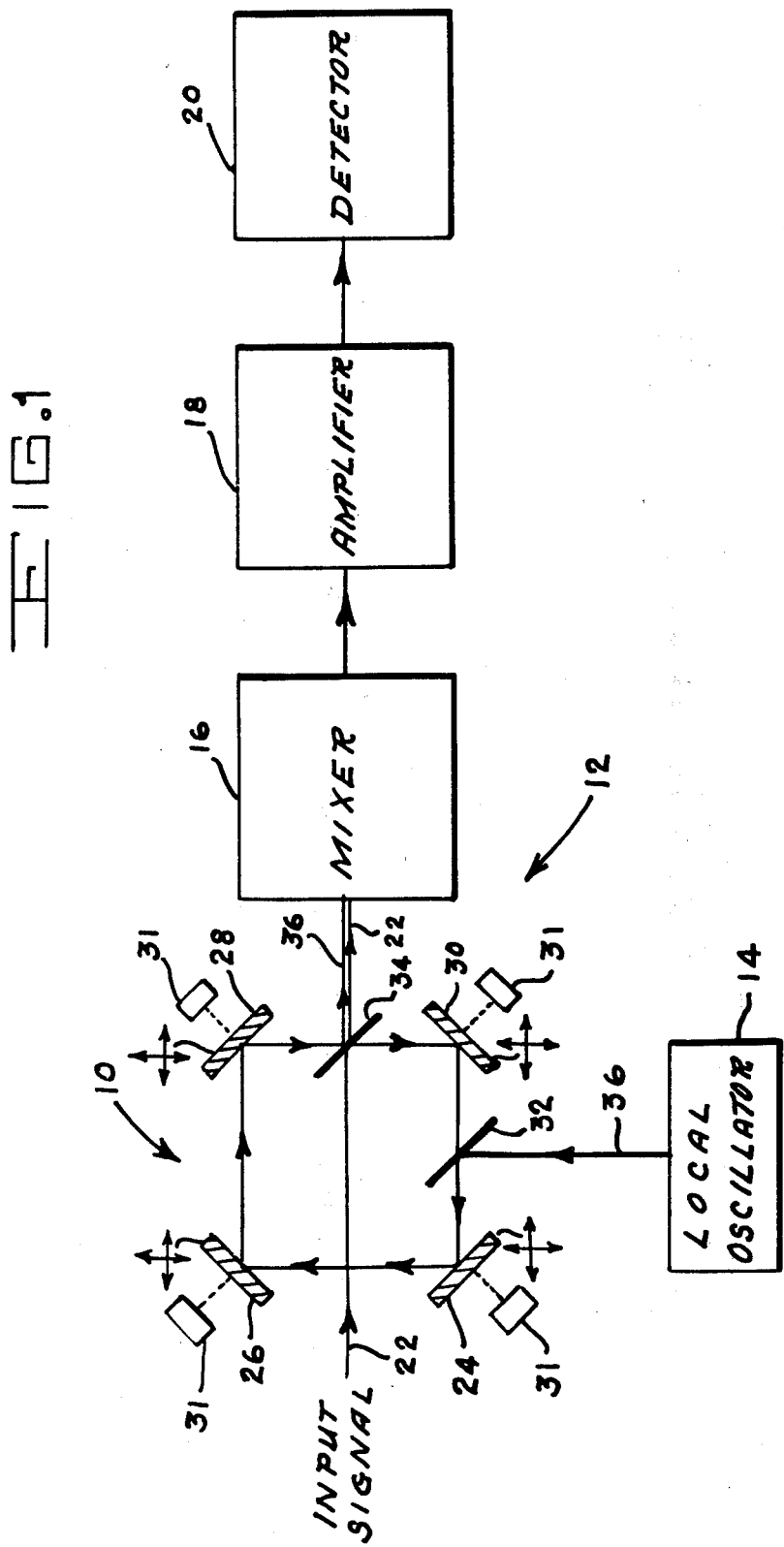

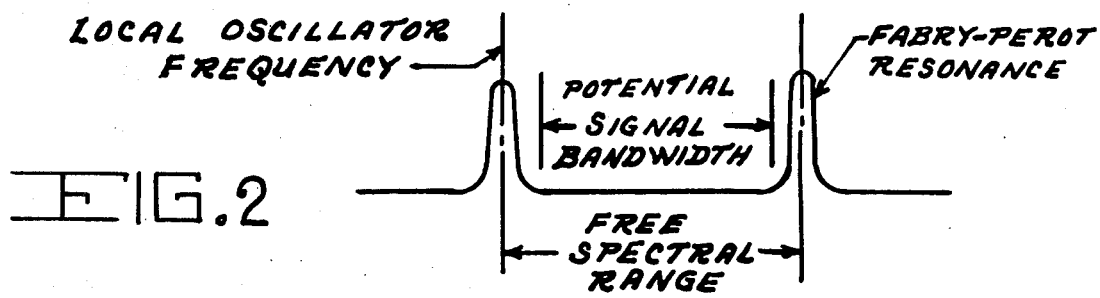
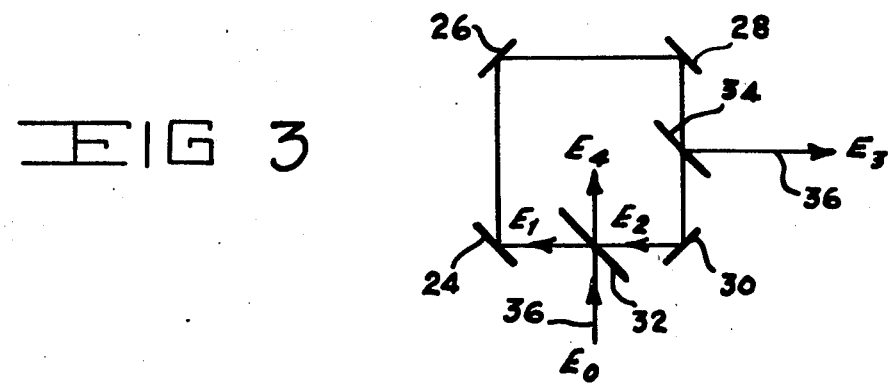
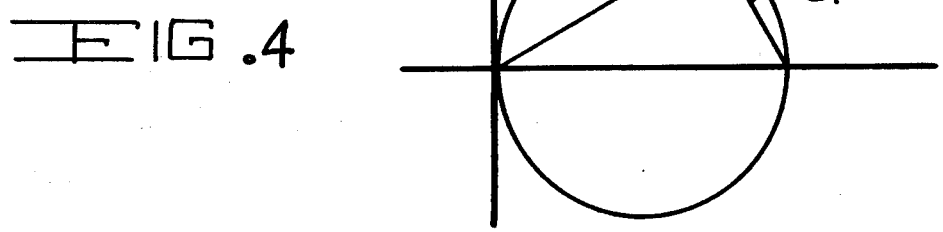

FABRY-PEROT DIPLEXER

BACKGROUND OF THE INVENTION

This invention relates generally to heterodyne receivers, and, more particularly to an improved Fabry-Perot diplexer for use within an optical heterodyne receiver.

The basic radio frequency heterodyne or superheterodyne receiver is well-known in the art. The receiver is primarily made up of the following elements: an RF amplifier (optional), a local oscillator, a mixer, an IF amplifier (optional) and a detector.

The RF amplifier (the first stage of the heterodyne receiver) generally provides an amplified signal for use within the receiver. The local oscillator generates an unmodulated RF signal whose frequency can be varied over a wide range to suit the range of carrier frequencies accepted by the receiver. The mixer accepts the amplified version of the carrier from the RF amplifier and the signal from the local oscillator. It combines or "mixes" these signals and produces a variety of signals in its output. Each signal bears the modulation of the RF carrier, but the frequency of one of them is equal to the difference between the RF carrier and the local oscillator frequency. This is the IF signal processed in the receiver. The IF signals derived from the mixer are too weak to be of much use and are therefore amplified in the IF amplifier. Assuming the IF signal has been amplified to a usable level, the next step in the evolution of the receiving chain is the incorporation therein of the detector. The detector extracts the intelligence from the modulated IF carrier for use at a desired time.

Unfortunately at shorter wavelengths or higher frequencies, that is, in the range of approximately 60-60,000 GHz (5mm to 5 $\mu$m) it becomes difficult to construct an effective microwave receiver. High ohmic loss per unit length and close physical tolerance requirements produce practical limitations on the fabrication of waveguide devices which have dimensional tolerances that are necessarily fractions of a wavelength.

In order to overcome the shortcomings of the ratio frequency heterodyne receivers for operation at short wavelengths it has been demonstrated that the microwave network functions can be accomplished optically. The optical heterodyne receiver, which, throughout the specification, is one which includes infrared submillimeter and millimeter wavelengths, involves operations with diffraction limited beams of at least a few tens of wavelengths in diameter. Since the energy in such beams does not interact with any guiding structure, transmission losses are virtually non-existant.

One requirement, however, of the optical heterodyne receiver is that the input beams entering the mixer portion of the receiver be parallel. In order to provide for such a parallel beam relationship optical heterodyne receivers heretofore in use have relied upon a diplexer which generally is in the form of a folded Fabry-Perot resonator of the type described in "A Quasi-optical Radiometer", Digest of the Second International Conference on Submillimeter Waves and their Applications, San Juan, Puerto Rico, Dec. 6-10, 1976 by J. J. Gustincic.

Since the fields which incorporate the optical heterodyne receiver at short wavelengths (infrared, submillimeter and millimeter wavelength region), such as $CO_2$ laser wavelengths as used in reconnaissance, communications, radar, imaging systems and pollution detection devices are an ever expanding area of usage, it is essential to provide an optical heterodyne receiver which is extremely economical to produce and highly effective in operation.

The optical heterodyne receivers in use today fail to meet the requirements set forth hereinabove since the diplexer used therein, such as the Fabry-Perot diplexer cited hereinabove relies upon high reflection (95% or higher, depending on the signal bandwidth) low transmission (5% or less) and *extremely* low loss (compared to transmission) mirrors in its construction. As a result thereof, such Fabry-Perot diplexers have large insertion losses because of the virtual impossibility of making extremely highly reflecting mirrors for use with short wavelengths which simultaneously have finite transmission and low absorption and scatter compared to the transmission. Since, heretofore, the solution to these problems have not been found, film coating for the infrared and meshes for the submillimeter and millimeter wavelength regions are conventionally used despite the existing problems.

SUMMARY OF THE INVENTION

The instant invention overcomes the problems set forth hereinabove by providing an improved Fabry-Perot diplexer which utilizes high reflectivity mirrors without the requirement for transmission as in the past.

The Fabry-Perot diplexer of this invention is a device for inputting two waves of differing frequencies from different directions and outputting these waves in the same direction, parallel to each other. As a result thereof, the Fabry-Perot diplexer of the instant invention finds applicability within an optical heterodyne receiver of the type discussed hereinabove.

Making up the Fabry-Perot diplexer of this invention are four optically aligned highly reflecting mirrors located at opposed corners of a substantially square optical configuration. Interposed between two pairs of mirrors are a first and second beamsplitter. The mirrors are made as highly reflecting as possible and need no transmission at a particular frequency of interest while the beamsplitters are composed of a thin, low absorption dielectric material made to give high transmission, low reflection and absorption and scattering loss much less than the reflection. These conditions, as opposed to prior art mirror requirements, can be easily met by applying suitable coatings and/or adjusting the beamsplitter thickness, if necessary.

During utilization in a heterodyne receiver, the mirrors are made as highly reflecting as possible at the frequency of, for example, the local oscillator. The beam of the local oscillator is brought into the diplexer by means of the first beamsplitter and exits from the diplexer in combination with the input signal from the second beamsplitter. From there, the signals are directed to the mixer of the heterodyne receiver.

The total path length around the diplexer formed by the four mirrors and pair of beamsplitters is adjusted for resonance at the wavelength of the local oscillator. Under these conditions, in analog with a conventional two mirror Fabry-Perot interferometer, the transmitted wave through the first beamsplitter is exactly cancelled through destructive interference.

It is therefore an object of this invention to provide an improved Fabry-Perot diplexer which eliminates the requirement of transmission in the mirrors of the Fabry-Perot diplexer.

It is another object of this invention to provide an improved Fabry-Perot diplexer which utilizes therein easily manufactured beamsplitters and still operates in analog to a conventional Fabry-Perot interferometer.

It is still another object of this invention to provide an improved Fabry-Perot diplexer which is extremely effective and efficient in operation.

It is a further object of this invention to provide an improved Fabry-Perot diplexer which finds utility within an optical heterodyne receiver.

It is still a further object of this invention to provide an improved Fabry-Perot diplexer which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

FIG. 1 is a schematic representation of an optical heterodyne receiver having the improved Fabry-Perot diplexer incorporated therein;;

FIG. 2 is a graphic representation showing the relationships between the local oscillator and signal frequencies and the improved Fabry-Perot diplexer of this invention;

FIG. 3 is a schematic representation of the improved Fabry-Perot diplexer of this invention setting forth the relevant electric fields; and FIG. 4 is a complex plane reprensetation of the equations, $|t^251 + |r|^2 = 1$ and $t - r = 1$ utilized in the detailed description of the improved Fabry-Perot diplexer of this invention.

DETAILED DESCRIPTION OF THE PREFERRED EMBODIMENT

Reference is now made to FIG. 1 of the drawing which clearly discloses the improved Fabry-Perot diplexer 10 incorporated with a conventional optical heterodyne receiver 12. Making up heterodyne receiver 12, in optical alignment with one another, are Fabry-Perot diplexer 10, a conventional local oscillator 14 such as a 10μ $CO_2$ laser, a conventional mixer 16 such as a HgCdTe infrared detector or Schottkey Barrier diode, a conventional tunable RF amplifier 18 and detector 20.

Receiving an input signal 22, which may be in the form of emission from a rocket exhaust or a return signal from a laser radar, is the improved Fabry-Perot diplexer 10 of this invention.

Diplexer 10 is made up of four reflecting elements preferably in the form of highly reflecting mirrors 24, 26, 28 and 30 in optical alignment with each other arranged at the four corners of a substantially square configuration. Mirrors 24, 26, 28 and 30 may be fixed for a predetermined optical path length or have any conventional moving means such as electric motors 31 attached thereto for adjustment thereof in a manner to be described in detail hereinbelow.

In addition to mirrors 24, 26, 28 and 30, a pair of directing means preferably in the form of conventional beamsplitters 32 and 34 are optically interposed between mirrors 24 and 30 and mirrors 28 and 30, respectively. One beamsplitter 34 receives input signal 22 while the other beamsplitter 32 receives a signal 36 emanating from local oscillator 14.

Mirrors 24, 26, 28 and 30 are made as highly reflecting as possible at a particular frequency of interest, for example, that of local oscillator (L.O.) 14 within heterodyne receiver 12. Local oscillator 14 might be, for example, at an infrared, submillimeter, or millimeter wave frequency. In addition, it is unnecessary with the diplexer 10 of this invention for mirrors 24, 26, 28 and 30 to have any transmission, thereby substantially improving their effectiveness.

As stated hereinabove, signal 36 of local oscillator 14 is brought into diplexer 10 by means of beamsplitter 32. Beamsplitter 32 and 34 are generally made of a thin, low absorption (at the L.O. wavelength) dielectric material such as mylar. They are furthermore made to give high transmission, low reflection (less than 5%) and absorption and scattering loss much less than the reflection. These conditions can be met by applying suitable coatings and adjusting the beamsplitter thickness if necessary. Beamsplitters 32 and 34 are made as nearly identical as possible.

The total path length around diplexer 10 formed by mirrors 24, 26, 28 and 30 and beamsplitters 32 and 34 is either preselected or adjusted by moving means 31 for resonance at the wavelength of local oscillator 14, i.e., the path length is adjusted to be an integral number of half the wavelength of local oscillator 14. This means that after a complete traversal of diplexer 10, the wave has the same phase with which it started. Under these conditions, in analogy with a conventional two mirror Fabry-Perot interferometer, the transmitted wave through beamsplitter 32 is exactly cancelled through destructive interference as shown hereinbelow.

The input power of local oscillator 14 incident on beamsplitter 32 outputs at beamsplitter 34 as shown. Actually, the fraction $$(1 - (\frac{A}{1-T}))^2$$

where A is the loss in each beamsplitter 32 and 34, respectively, and T is its transmission. The fraction being nearly equal to 1(one) under the conditions set forth hereinabove.

The desired signal 22 of heterodyne receiver 12 is incident directly on beamsplitter 34 as shown. The spacing of diplexer 10 of this invention and the transmission of beamsplitters 32 and 34 are chosen in such a way that the signal wave 22 is non-resonant over its entire bandwidth. The relationships between local oscillator 14 and signal frequencies and the diplexer are shown clearly in FIG. 2 of the drawing.

Under the above conditions signal 22 passes through beamsplitter 34 suffering only the reflection loss (5% or less) and emerges from beamsplitter 34 co-linear with signal 36 from local oscillator 14 ready to be directed through mixer 16, amplifier 18 and into detector 20.

For a further explanation of the operation of Fabry-Perot diplexer 10 reference is now made to FIG. 3 of the drawing. Diplexer 10 behaves as a conventional Fabry-Perot interferometer for a frequency near one of its resonance frequencies. For this we define fields as shown in FIG. 3. For simplicity it is assumed each of the mirrors 24, 26, 28 and 30 is 100% reflecting and that beamsplitters 32 and 34 have no loss. Letting the amplitude transmission and reflection of beamsplitters 32 and 34 be t and r respectively, we have $$E_1 = rE_O + tE_2 \tag{1}$$

$$E_3 = rE_1 e^{ikL_1} \quad (2)$$

$$E_2 = tE_1 e^{ikL} \quad (3)$$

$$E_4 = tE_0 + rE_2 \quad (4)$$

where $L_1$ is the longer path length between beamsplitter 32 and beamsplitter 34 and L is the total path length. Then $$E_1 = rE_0 + r^2 E_1 e^{ikL} \quad (5)$$

or $$E_1 = \frac{rE_0}{1 - r^2 e^{ikL}}$$

which displays the resonance behavior of $E_1$. From (4)

$$E_4 = tE_0 + \frac{r^2 t e^{ikL}}{1 - r^2 e^{ikL}} E_0$$

or $$E_4 = \frac{tE_0}{1 - r^2 e^{ikL}} \{1 - (t^2 - r^2) e^{ikL}\} \quad (6)$$

and from (2)

$$E_3 = \frac{r^2 E_0}{1 - r^2 e^{ikL}} \quad (7)$$

Now energy conservation gives $$|t^2| + |r|^2 = 1 \quad (8)$$

and Maxwell's equation gives $$t - r = 1 \quad (9)$$

Equations (8) and (9) can be depicted by the complex plane representation shown in FIG. 4. For $|t|^2 \approx 1$ and $|r|^2$ small it is clear from FIG. 4 that $t = |t|$ and $r = i|r|$. Hence, on resonance, $(kL = 1)$ eq 6 gives $E_4 = 0$ eq 7 gives $|E_3|^2 = |E_0|^2$ That is there is no transmitted wave at beamsplitter 32 and all the incident power at beamsplitter 32 exits diplexer 10 at beamsplitter 34.

In operation, a signal 22 from, for example, a rocket exhaust impinges upon beamsplitter 34 of Fabry-Perot diplexer 10 of this invention. Simultaneously, local oscillator 14 directs its signal 36 which is at a different frequency from signal 22 onto beamsplitter 32 of diplexer 10. Fabry-Perot diplexer 10 of the instant invention is then adjusted by adjusting means 31 so that diplexer 10 is non-resonant at the frequencies of signal 22 but resonant at the frequency of signal 36 of local oscillator 14. It should be noted, however, if desired, Fabry-Perot diplexer 10 can be preset at a single predetermined local oscillator frequency and then no adjustments thereof are necessary.

As a result of the above configuration of diplexer 10 of this invention signals 22 and 36 exit diplexer 10 by way of beamsplitter 34, parallel and overlapping without losses as in prior art devices. Signals 22 and 36 are then processed in a conventional manner by mixer 16 and amplifier 18 before being detected by any conventional detector 20.

Although this invention has been described with reference to a particular embodiment, it will be understood to those skilled in the art that this invention is also capable of a variety of alternate embodiments within the spirit and scope of the appended claims.

I claim:

1. In a heterodyne receiver having a local oscillator, a mixer, and a detector, the improvement therein residing in a Fabry-Perot diplexer operably interposed between means for providing an input signal, said local oscillator and said mixer, said Fabry-Perot diplexer comprising a plurality of reflective elements optically aligned with one another and forming an optical path therebetween, first means located within said optical path for receiving and directing a signal emitted by said local oscillator into said optical path, second means located within said optical path for receiving said input signal and said local oscillator signal and directing said input signal and said local oscillator signal in a parallel and overlapping relationship to said mixer and the total length of said optical path of said diplexer being defined for non-resonance at the frequencies of said input signal and resonance at the frequency of said local oscillator signal whereby said input signal and said local oscillator signal directed to said mixer are substantially without loss.

2. In a heterodyne receiver having a local oscillator, a mixer, and a detector as defined in claim 1 wherein said first and said second directing means are beamsplitters.

3. In a heterodyne receiver having a local oscillator, a mixer, and a detector as defined in claim 2 wherein said diplexer comprises four of said reflective elements.

4. In a heterodyne receiver having a local oscillator, a mixer, and a detector as defined in claim 3 wherein said first beamsplitter is optically interposed between two of said reflective elements and said second beamsplitter is optically interposed between one of said two reflective elements and a third of said reflective elements.

5. In a heterodyne receiver having a local oscillator, a mixer, and a detector as defined in claim 1 wherein said reflective elements are highly reflective and have substantially no transmission.

6. In a heterodyne receiver having a local oscillator, a mixer, and a detector as defined in claim 5 wherein said first and second directing means are beamsplitters.

7. In a heterodyne receiver having a local oscillator, a mixer, and a detector as defined in claim 6 wherein said beamsplitters are made of a low absorption dielectric material made to give high transmission, low reflection and absorption and scattering loss much less than said reflection.

8. In a heterodyne receiver having a local oscillator, a mixer, and a detector as defined in claim 7 wherein said diplexer further comprises means operatively connected to said reflective elements for adjusting said optical path.

9. A Fabry-Perot diplexer comprising a plurality of reflective elements optically aligned with one another and forming an optical path therebetween, first means located within said optical path for receiving and directing a first signal into said optical path, second means located within said optical path for receiving said first input signal and a second input signal and directing out of said optical path said first and second input signals in the form of a pair of output signals in parallel and overlapping relationship with respect to one another and the total length of said optical path of said diplexer being defined for nonresonance at the frequencies of said second input signal and resonance at the frequency of said first input signal whereby said output signals are substantially without loss.

10. A Fabry-Perot diplexer as defined in claim 9 wherein said first and said second directing means are beamsplitters.

11. A Fabry-Perot diplexer as defined in claim 10 wherein said diplexer comprises four of said reflective elements.

12. A Fabry-Perot diplexer as defined in claim 11 wherein said first beamsplitter is optically interposed between two of said reflective elements and said second beamsplitter is optically interposed between one of said two reflective elements and a third of said reflective elements.

13. A Fabry-Perot diplexer as defined in claim 9 wherein said reflective elements are highly reflective and have substantially no transmission.

14. A Fabry-Perot diplexer as defined in claim 13 wherein said first and said second directing means are beamsplitters.

15. A Fabry-Perot diplexer as defined in claim 14 wherein said beamsplitters are made of a low absorption dielectric material made to give high transmission, low reflection and absorption and scattering loss much less than said reflection.

16. A Fabry-Perot diplexer as defined in claim 15 wherein said diplexer further comprises means operatively connected to said reflective elements for adjusting said optical path.

* * * * *